(12) United States Patent
Zou (10) Patent No.: US 12,147,622 B2
(45) Date of Patent: Nov. 19, 2024

(54) DISPLAY DEVICE

(71) Applicant: Shenzhen China Star Optoelectronics Semiconductor Display Technology Co., Ltd., Shenzhen (CN)

(72) Inventor: Guangnan Zou, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/430,104

(22) PCT Filed: May 19, 2021

(86) PCT No.: PCT/CN2021/094493
§ 371 (c)(1),
(2) Date: Aug. 11, 2021

(87) PCT Pub. No.: WO2022/160516
PCT Pub. Date: Aug. 4, 2022

(65) Prior Publication Data
US 2023/0367408 A1 Nov. 16, 2023

(30) Foreign Application Priority Data
Jan. 28, 2021 (CN) .......................... 202110119782.0

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01)

(58) Field of Classification Search
CPC .............................. G06F 3/0412; G06F 3/044
See application file for complete search history.

(56) References Cited

U.S. PATENT DOCUMENTS

| | | | |
|---|---|---|---|
| 2014/0016048 A1 | 1/2014 | Omote | |
| 2018/0143482 A1 | 5/2018 | Jin | |
| 2019/0155089 A1* | 5/2019 | Lee | ..................... G02B 6/0088 |
| 2020/0311367 A1* | 10/2020 | Hu | ......................... G06F 3/0446 |
| 2021/0408412 A1* | 12/2021 | Park | ......................... B32B 7/14 |

FOREIGN PATENT DOCUMENTS

| | | |
|---|---|---|
| CN | 104254047 A | 12/2014 |
| CN | 104635974 A | 5/2015 |
| CN | 104798017 A | 7/2015 |

(Continued)

*Primary Examiner* — Stacy Khoo
(74) *Attorney, Agent, or Firm* — Menachem Nathan; Nathan & Associates (57) ABSTRACT

The embodiments of the present application disclose a display device including a cover plate including a first cover plate, and a second cover plate and a third cover plate respectively adjacent to both terminals of the first cover plate, wherein the first cover plate, the second cover plate, and the third cover plate form an accommodating space; a display module positioned in the accommodating space and at least partially attached to the first cover plate; and a rear shell opposite to the first cover plate and connected to the second cover plate and the third cover plate. The display device of the present application removes a middle frame, thereby reducing a cost thereof.

17 Claims, 7 Drawing Sheets

(56) References Cited

FOREIGN PATENT DOCUMENTS

| | | | | |
|---|---|---|---|---|
| CN | 106502440 A | | 3/2017 | |
| CN | 107506075 A | | 12/2017 | |
| CN | 107992235 A | * | 5/2018 | |
| CN | 208079538 U | | 11/2018 | |
| CN | 109064888 A | * | 12/2018 | |
| CN | 209170449 U | * | 7/2019 | |
| CN | 110096176 A | | 8/2019 | |
| CN | 110120996 A | * | 8/2019 | ........... G06F 1/1637 |
| CN | 110413154 A | | 11/2019 | |
| CN | 111710247 A | | 9/2020 | |
| CN | 112002221 A | | 11/2020 | |
| CN | 112764586 A | | 5/2021 | |
| KR | 20060025655 A | * | 6/2003 | |
| WO | WO-2018184253 A1 | * | 10/2018 | ....... G02F 1/133308 |

* cited by examiner

DISPLAY DEVICE

FIELD OF INVENTION

The present application relates to a field of display technology and more particularly to a display device.

BACKGROUND OF INVENTION

In recent years, film structure capacitive screens using nano-silver materials have gradually become matured and increased in number. There are many small and medium-sized bar screens, such as special-sized displays with an aspect ratio of 21 to 9 or 4 to 3, applied in commercial displays. These small and medium-sized bar screens are configured to control a display device by touch control, wherein a capacitive touch module is adopted inside thereof. Since a film structure of a touch module is too soft, the touch module is prone to scratches or water ripples when pressed, and cannot be directly used for touch control. Therefore, adding a cover plate in front of the display device is necessary to protect a touch layer of the touch module. However, at present, most of the pads and mobile phones on the market are formed by a four-part frame including a fully bonded cover, a metal middle frame, a module, and a back-shell. A problem with this manufacturing method is that a set of the middle frame increases the cost. Furthermore, due to the set of the middle frame, during manufacturing of the display device, there are at least two bonding processes included between the middle frame and the cover, between the middle frame and a display module, or between the display module and the cover, which causes the manufacturing process of the display device to be cumbersome and complicated. At the same time, the two bonding processes also increase a length between the cover plate and the touch layer of the display module of the display device along a first direction, increasing a gap between the cover plate and the touch layer and reducing touch sensitivity.

Therefore, in the current display device technology, there are still problems of increased cost and manufacturing difficulty due to a setting of a middle frame, which is in urgent need of improvement.

SUMMARY OF INVENTION

The embodiments of the present application relate to a display device, which is used to solve the problems in the prior art that the cost and manufacturing difficulty are increased due to a setting of a middle frame.

In order to solve the above problems, the technical solutions provided by the embodiments of the present application are as follows:

Embodiments of the present application provide a display device including:
- a cover plate including a first cover plate, and a second cover plate and a third cover plate respectively adjacent to both terminals of the first cover plate, wherein the first cover plate, the second cover plate, and the third cover plate form a first accommodating space;
- a display module positioned in the first accommodating space and at least partially attached to the first cover plate; and
- a rear shell opposite to the first cover plate and connected to the second cover plate and the third cover plate.

In some embodiments, the display device is a rectangular parallelepiped, and wherein the display device extends in a first direction, a second direction, and a third direction respectively.

In some embodiments, the first direction is perpendicular to the second direction, and the third direction is perpendicular to the first direction and is also perpendicular to the second direction.

In some embodiments, the display module includes a touch layer disposed facing the first cover plate.

In some embodiments, a distance between the first cover plate and the touch layer is a first length L1, and wherein a length of the first length L1 is shorter than or equal to 0.05 mm.

In some embodiments, the second cover plate is parallel to the third cover plate, and wherein the second cover plate and the third cover plate are perpendicular to the first cover plate respectively.

In some embodiments, an outer corner between the second cover plate and the first cover plate, and an outer corner between the first cover plate and the third cover plate are rounded corners.

In some embodiments, a thickness of the second cover plate is equal to a thickness of the first cover plate and is equal to a thickness of the third cover plate, and wherein a length of the second cover plate is equal to a length of the third cover plate and is shorter than a length of the first cover plate.

In some embodiments, a side of the second cover plate or the third cover plate away from the rear shell is further provided with a headphone jack, a universal serial bus jack, a power jack, or a screw hole.

In some embodiments, the display module is attached to the first cover plate by a black conductive adhesive.

In some embodiments, the black conductive adhesive includes a first black conductive adhesive and a second black conductive adhesive, and the display module is attached to the first cover plate and the second cover plate by the first black conductive adhesive, and the display module is attached to the first cover plate and the third cover plate by the second black conductive adhesive.

In some embodiments, a first portion of the first black conductive adhesive and a first portion of the second black conductive adhesive cover a region other than an active area between the first cover plate and the display module.

In some embodiments, a second portion of the first black conductive adhesive is disposed between the second cover plate and the display module, and a second portion of the second black conductive adhesive is disposed between the third cover plate and the display module.

In some embodiments, the rear shell includes at least one pressing structure, a side of the pressing structure abuts a side of the display module away from the first cover plate.

In some embodiments, the rear shell further includes a housing, the pressing structure includes a pressing portion and a connecting portion, the pressing portion abuts against the side of the display module away from the first cover plate, the connecting portion is connected to the housing.

In some embodiments, the pressing structure is made of an elastic material.

In some embodiments, the rear shell further includes a second accommodating space formed by the pressing structure and the housing, and the second accommodating space is configured to accommodate electronic devices.

In some embodiments, the at least one pressing structure is two pressing structures.

In some embodiments, a material of the cover plate is selected from polymethyl methacrylate, polycarbonate, or polyethylene terephthalate.

In some embodiments, an inner surface of the cover plate is further provided with a black silk screen.

In the display device provided by the embodiment of the present application, the display device includes a cover plate including a first cover plate, and a second cover plate and a third cover plate respectively adjacent to both terminals of the first cover plate, wherein the first cover plate, the second cover plate, and the third cover plate form a first accommodating space; a display module positioned in the first accommodating space and at least partially attached to the first cover plate; and a rear shell opposite to the first cover plate and connected to the second cover plate and the third cover plate; this structural design removes a middle frame, thereby reducing a cost of the display device.

Further, in the display device provided by the embodiment of the present application, since the middle frame is removed, the manufacturing between the cover plate and the display module can be completed by only pasting once, which simplifies the manufacturing steps and also reduces a gap between the cover plate and the display module, maximally ensuring the touch sensitivity of the touch layer in the display module.

Finally, due to the second cover and the third cover of the cover plate, a direction (i.e., a second direction) of the display device perpendicular to a plane where the second cover located is limited, thereby ensuring a stability of the display device along the second direction. Due to the first cover plate, the display module, and the rear shell, a direction (i.e., a first direction) of the display device perpendicular to a plane where the display module located is limited, thereby ensuring a stability of the display device along the first direction.

DETAILED DESCRIPTION OF EMBODIMENTS

The technical solutions in the embodiments of the present application will be clearly and completely described below in conjunction with the figures in the embodiments of the present application. Obviously, the described embodiments are only a part of the embodiments of the present application, rather than all the embodiments. Based on the embodiments in the present application, all other embodiments obtained by those skilled in the art without inventive steps shall fall within a protection scope of the present application.

In a description of the present application, it should be understood that the terms "center", "longitudinal", "transverse", "length", "width", "thickness", "upper", "lower", "front", "back", "left", "right", "vertical", "horizontal", "top", "bottom", "inner", "outer", "clockwise", "counterclockwise" and other directions or positional relationship is based on orientation or positional relationship shown in the figures, and is only for the convenience of describing the present application and simplifying the description, and does not indicate or imply that the device or element referred to must have a specific orientation, be constructed and operated in a specific orientation, therefore, it cannot be understood as a restriction on the present application. In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include one or more of the features. In the description of the present application, "multiple" means two or more than two, unless otherwise specifically defined.

The embodiments of the present application provide a display device. For details, please refer to FIG. 1 to FIG. 19.

At present, most of the pads and mobile phones on the market are formed by a four-part frame including a fully bonded cover, a metal middle frame, a module, and a back-shell. A problem with this manufacturing method is that a middle frame must be set to fix internal components of the display device, thereby increasing a material cost. Furthermore, due to the set of the middle frame, during manufacturing of the display device, there are at least two bonding processes included between the middle frame and the cover, between the middle frame and a display module, or between the display module and the cover, which causes the manufacturing process of the display device to be cumbersome and complicated. At the same time, the two bonding processes also increase a length between the cover plate and the touch layer of the display module of the display device along a first direction, increasing a gap between the cover plate and the touch layer and reducing touch sensitivity. Then, outermost sides of the currently middle frame are arranged on a left and right side of the display device for fixing the display device in a direction perpendicular to a plane where the second cover is located (i.e., the second direction), and the two bonding processes between the cover plate and the middle frame, and between the middle frame and the rear-shell have high requirements on the manufacturing process. Furthermore, in the current display device design, in order to make the rear-shell and the middle frame closely cooperated, the rear-shell protrudes from the display device in a direction opposite to the first direction, wherein this design of the rear-shell causes two technical problems: first, the positioning of the rear shell in the first direction and the second direction needs to be matched with the middle frame, and second, the rear-shell protruding from the display device in a direction opposite to the first direction increases a thickness of the display device. Therefore, one embodiment of the present application provides a display device to solve the above-mentioned problems.

Figure 1:
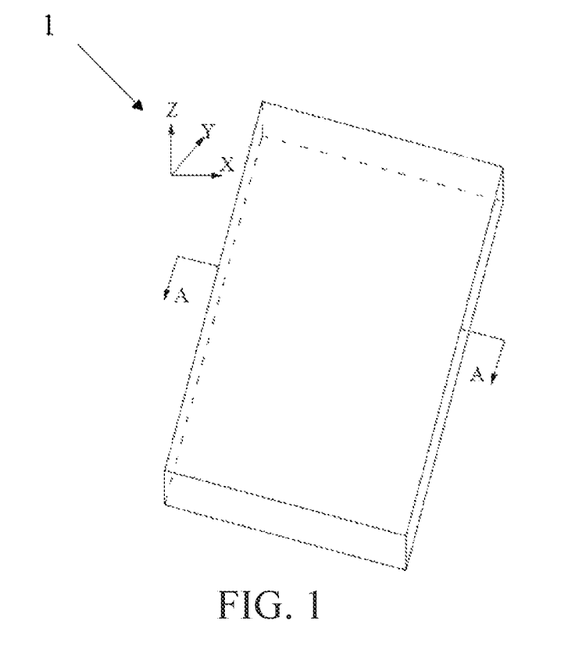
FIG. 1 is a schematic diagram of a first structure of a display device provided by one embodiment of the present application.

Referring to FIG. 1, FIG. 1 is a schematic diagram of a first structure of a display device provided by one embodiment of the present application. As shown in the FIG. 1, the display device 1 is a rectangular parallelepiped, and the display device 1 extends in a first direction, a second direction, and a third direction, respectively. Positionings of the display device 1 in the first direction and the second direction are both limited by a cover plate 14, thereby ensuring that positionings of components along the first direction and the second direction inside the display device 1 can be stable without a middle frame.

The first direction (Z direction) is perpendicular to the second direction (X direction), and the third direction (Y direction) is perpendicular to the first direction (Z direction) and also perpendicular to the second direction (X direction). That is, the first direction is a direction perpendicular to a plane where the display module is located, the second direction is a direction perpendicular to a plane where a second cover plate is located, and the third direction is a direction perpendicular to the first direction and the second direction at the same time; in other words, the first direction (Z direction), the second direction (X direction), and the third direction (Y direction) are perpendicular to each other.

Figure 2:
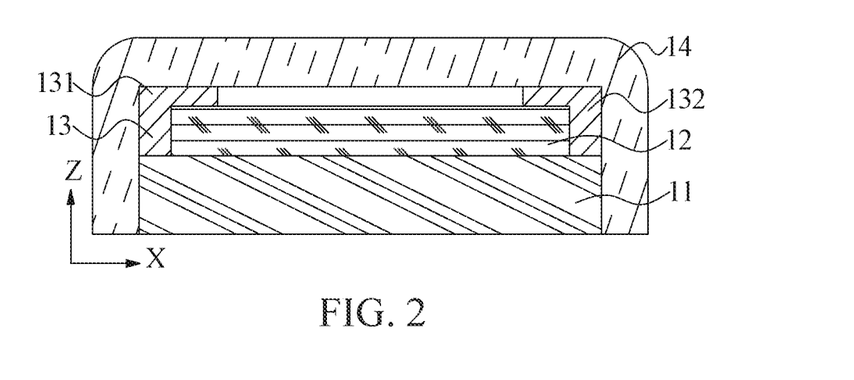
FIG. 2 is a schematic diagram of a second structure of the display device provided by one embodiment of the present application.

Referring to FIG. 2, FIG. 2 is a schematic diagram of a second structure of the display device provided by one embodiment of the present application, that is, a cross-sectional view of the display device 1 along line A-A. One embodiment of the present application provides a display device including a cover plate 14 comprising a first cover plate 141, and a second cover plate 142 and a third cover plate 143 respectively adjacent to both terminals of the first cover plate 141, wherein the first cover plate 141, the second cover plate 142, and the third cover plate 143 form a first accommodating space; a display module 12 positioned in the first accommodating space and at least partially attached to the first cover plate 141; and a rear shell 11 opposite to the first cover plate 141 and connected to the second cover plate 142 and the third cover plate 143. This structural design of the cover plate 14 can also position the components in the first direction and the second direction inside the display device 1 without using the middle frame, which simplifies the manufacturing process and saves material and cost.

In some embodiments, a touch layer is disposed on a side of the display module 12 facing the first cover plate 141. It is understandable that the user touches the touch layer by touching a side of the cover plate 14 away from the rear shell 11.

Further, a distance between the first cover plate and the touch layer is a first length L1, the first length L1 has a certain preset length range, wherein the certain preset length range of the first length L1 is shorter than or equal to 0.05 mm.

In some embodiments, the display module 12 is partially attached to the first cover plate 141 through a black conductive adhesive 13. Further, the black conductive adhesive 13 includes a first black conductive adhesive 131 and a second black conductive adhesive 132, wherein the first black conductive adhesive 131 and the second black conductive adhesive 132 are oppositely arranged; the first black conductive adhesive 131 is attached to the second cover plate 142 and the first cover plate 141, and the second black conductive adhesive 132 is attached to the first cover plate 141 and the third cover plate 143.

Figure 3A:
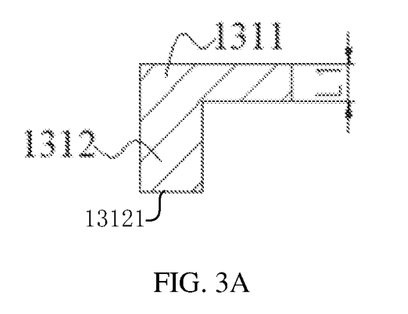
FIG. 3A is a schematic diagram of a structure of a first black conductive adhesive in the display device provided by one embodiment of the present application.
Figure 3B:
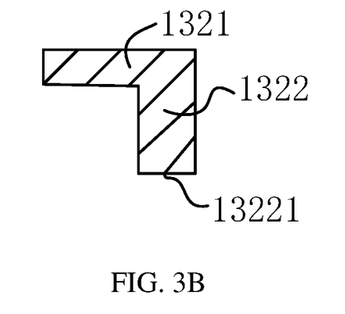
FIG. 3B is a schematic diagram of a structure of a second black conductive adhesive in the display device provided by one embodiment of the present application.

It is understandable that the black conductive adhesive 13 includes: a first black conductive adhesive 131 and a second black conductive adhesive 132, wherein the first black conductive adhesive 131 and the second black conductive adhesive 132 are oppositely disposed. As shown in FIGS. 3A and 3B, a first portion 1311 of the first black conductive adhesive intersects a second portion 1312 of the first black conductive adhesive, a first portion 1321 of the second black conductive adhesive intersects a second portion 1322 of the second black conductive adhesive, that is, the first black conductive adhesive 131 and the second black conductive adhesive 132 are partially attached to the first cover plate 141. The second portion 1312 of the first black conductive adhesive includes a free end 13121, and the second portion 1322 of the second black conductive adhesive includes a free end 13221. For example, with reference to FIGS. 3A, 3B and 5, the display module 12 facing away from two terminals of a side of the rear shell 11 are attached to the first cover plate 141 through the first portion 1311 of the first black conductive adhesive and the first portion 1321 of the second black conductive adhesive, respectively. The free ends 13121, 13221 are flush with a bottom surface of the display module 12. A length of the first portion 1311 of the first black conductive adhesive along the first direction is shorter than or equal to 0.05 mm, to fully ensure a sensitivity of touch sensing of the touch layer of the display module 12, and a length between the first cover plate 141 and the display module 12 should be shorter than or equal to 0.05 mm, that is, a range of the first length L1 is shorter than or equal to 0.05 mm. Because if the length of the first black conductive adhesive 131 along the first direction is increased, a gap between the first cover plate 141 and the display module 12 is increased, thereby a sensing amount of the touch layer of the display module 12 is reduced, and a signal noise ratio (SNR) of the touch layer is also reduced, and reducing the sensitivity of the touch layer. Therefore, setting the length of the second portion 1312 along the first direction to an appropriate length range to prevents a sensitivity failure of the touch layer in the display module 12 and ensures the sensitivity of the touch layer.

Further, the first portion 1311 of the first black conductive adhesive 131 and the first portion 1321 of the second black conductive adhesive 132 cover a region other than a view area (VA) between the first cover plate 141 and the display module 12, to prevent the first portion 1311 of the first black conductive adhesive 131 and the first portion 1321 of the second black conductive adhesive 132 from blocking the viewing angle of the view area of the display device 1.

Further, the black conductive adhesive 13 further includes a second portion, that is, a second portion 1312 of the first black conductive adhesive and a second portion 1322 of the second black conductive adhesive, the second portion 1312 of the first black conductive adhesive is disposed between the second cover plate 142 and the display module 12, and is used for fixing the second cover plate 142 and the display module 12 and filling a gap between the second cover plate 142 and the display module 12. The second portion 1322 of the second black conductive adhesive 132 is disposed between the third cover plate 143 and the display module 12, and is used for fixing the third cover plate 143 and the display module 12 and filling the gap between the third cover plate 143 and the display module 12. This structural arrangement facilitates the positioning of the display device 1 during manufacturing, and ensures a stability of the positioning of the left and right terminals of the display device 1.

Specifically, it can be seen from FIG. 2 that a side view of the second black conductive adhesive 132 has a 7-shape structure, and a side view of the first black conductive adhesive 131 has a 7-shape structure rotated 180 degrees in the first direction.

Figure 4:
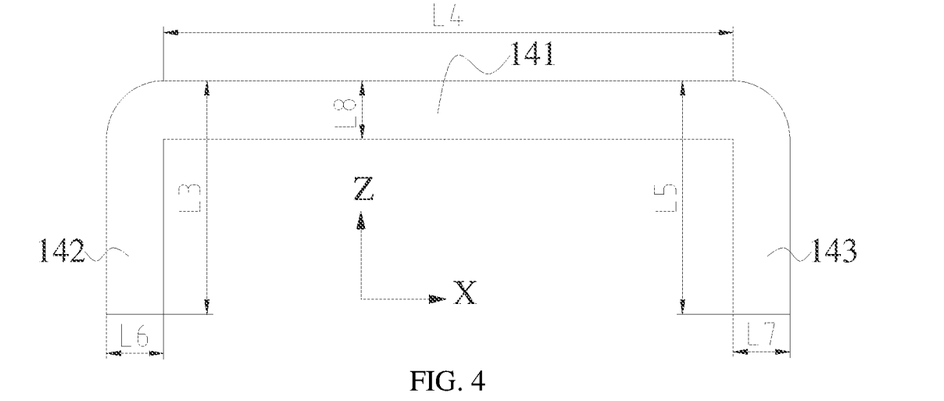
FIG. 4 is a schematic structural diagram of a cover plate in the display device provided by one embodiment of the present application.

Further, referring to FIG. 4, FIG. 4 is a schematic structural diagram of a cover plate in the display device provided by one embodiment of the present application. The second cover plate 142 perpendicularly intersects the first cover plate 141, the first cover plate 141 perpendicularly intersects the third cover plate 143, wherein the second cover plate 142 is parallel to the third cover plate 143; a length of the second cover plate 142 along the first direction is a third length L3, a length of the first cover plate 141 along the second direction is a fourth length L4, a length of the third cover plate 143 along the first direction is a fifth length L5, a length of the second cover plate 142 along the second direction is a sixth length L6, a length of the first cover plate 141 along the first direction is an eighth length L8, and a length of the third cover plate 143 along the second direction is a seventh length L7.

Specifically, in order to ensure a high light transmittance of the display device 1, a material of the cover plate 14 is selected from high light transmittance polymethyl methacrylate (PMMA), polycarbonate (PC), or polyethylene terephthalate (PET). Further, an outer corner between the second cover plate 142 and the first cover plate 141, and an outer corner between the first cover plate 141 and the third cover plate 143 are rounded corners to prevent users from cutting their fingers and make the display device 1 more aesthetically pleasing. An inner corner between the second cover plate 142 and the first cover plate 141, and an inner corner between the first cover plate 141 and the third cover plate 143 are all less than 180 degrees. Preferably, an inner angle between the second cover plate 142 and the first cover plate 141 is a first inner angle, and an inner angle between the first cover plate 141 and the third cover plate 143 is a second inner angle, and both the first inner angle and the second inner angle can be an acute angle, a right angle, or an obtuse angle. When the first angle and the second angle are acute angles, it is difficult to manufacture the display device 1.

When the first inner angle and the second inner angle are obtuse angles, it is easy to manufacture the display device 1 but affects an appearance and wastes materials. When the first inner angle and the second inner angle are right angles, it is easy to manufacture the display device 1 and make the display device 1 aesthetically pleasing. Therefore, the first inner angle and the second inner angle are preferably right angles, that is, the first cover plate 141 and the second cover plate 142 intersect perpendicularly, and the first cover plate 141 and the third cover plate 143 intersect perpendicularly, to facilitate an installation and precise positioning of the components in the display device 1, and also reduce a possibility of shaking of the internal components of the display device 1.

A total thickness of the cover plate 14 remains unchanged, the length of the second cover plate 142 is equal to the length of the third cover plate 143 and is shorter than the length of the first cover plate 141. That is, the sixth length L6 is equal to the seventh length L7 and the eighth length L8, and the third length L3 is equal to the fifth length L5 and shorter than the fourth length L4. It is understandable that the cover plate 14 is a flat cover plate that became an n-shaped cover plate after bending, to ensure the lengths of the two side edges along the first direction are equal. Therefore, a thickness of the second cover plate 142 is equal to a thickness of the first cover plate 141 and a thickness of the third cover plate 143. The length of the second cover plate 142 is equal to the length of the third cover plate 143 and shorter than the length of the first cover 141.

Further, the eighth length L8 has a certain preset length, and the preset length of the eighth length L8 ranges from 1 mm to 3 mm, that is, a thickness of the cover plate ranges from 1 mm to 3 mm, which can ensure that the user does not damage the touch layer when using it, and can also ensure a touch sensitivity of the touch layer.

It can be understood that the first cover plate 141 has a certain preset thickness, and the preset thickness of the first cover plate 141 ranges from 1 to 3 mm, so as to ensure that the display module 12 prevents external water vapor, impurities, etc. from affecting a quality of the display module 12, and a touch sensitivity of the touch layer in the display module 12 can be ensured to be the best.

Further, a headphone jack, a universal serial bus (USB) jack, a power jack, or a screw hole is also provided on a side of the second cover plate 142 or the third cover plate 143 away from the rear shell 11.

Further, the rear shell 11 includes at least one pressing structure, and one side of the pressing structure abuts against a side of the display module 12 away from the first cover plate 141.

Wherein, abuts against means that the adjacent surfaces are in direct contact with the surface and there is a certain force to ensure a stability of the two surfaces in contact with each other in the direction away from the contact surface, and prevent the gap between the two contact surfaces from causing misalignment and movement.

Specifically, the rear shell 11 in the display device 1 provided by the embodiment of the present application includes at least one pressing structure, and a side of the pressing structure abuts a side of the display module 12 away from the first cover plate 141. The pressing structure is used for fixing the display device 1 along a direction perpendicular to the plane where the display module 12, and is positioned together with the display module 12 and the first cover plate 141.

Figure 5:
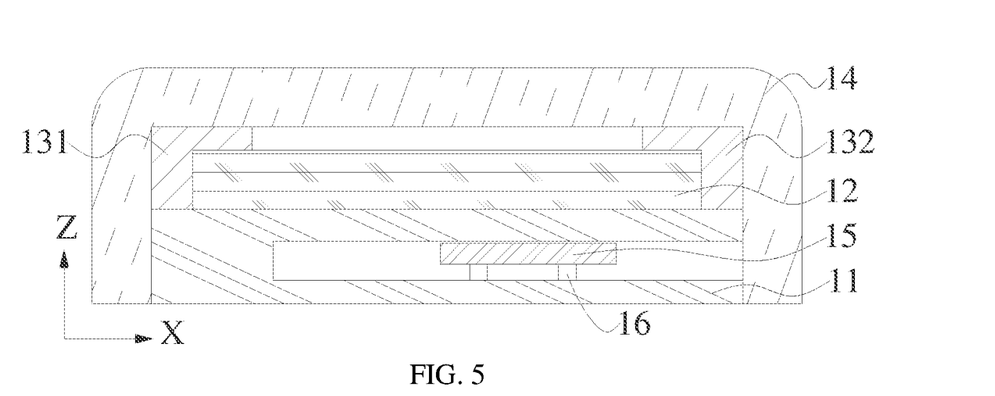
FIG. 5 is a schematic diagram of a third structure of the display device provided by one embodiment of the present application.
Figure 7:
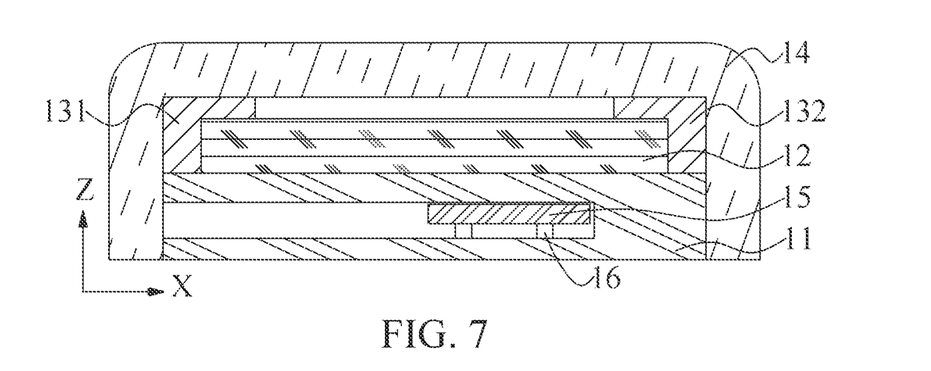
FIG. 7 is a schematic diagram of a fourth structure of the display device provided by one embodiment of the present application.

In some embodiments, the rear shell 11 includes one pressing structure. Referring to FIG. 5, FIG. 5 is a schematic diagram of a third structure of the display device provided by one embodiment of the present application. Referring to FIG. 7, FIG. 7 is a schematic diagram of a fourth structure of the display device provided by one embodiment of the present application.

Figure 6:
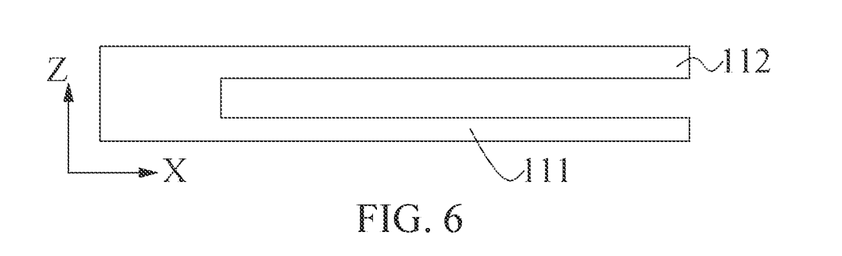
FIG. 6 is a schematic diagram of a first structure of a rear shell of the display device provided by one embodiment of the present application.
Figure 8:
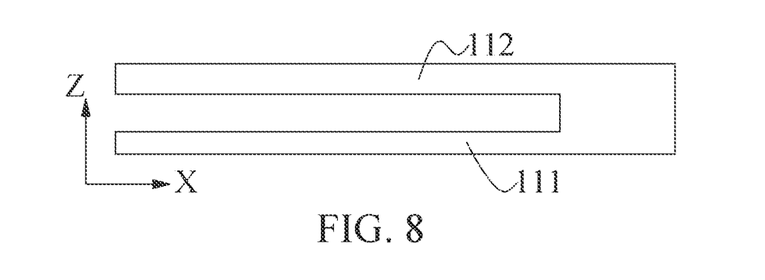
FIG. 8 is a schematic diagram of a second structure of the rear shell of the display device according to one embodiment of the present application.

Further, when the rear shell 11 includes one pressing structure, the pressing structure is called a single pressing structure, and a length of the single pressing structure along the second direction is longer than a length of the display module 12 along the second direction. Referring to FIG. 6, FIG. 6 is a schematic diagram of a first structure of a rear shell of the display device provided by one embodiment of the present application. In one embodiment, the rear shell 11 includes one single pressing structure 112 and one shell 111, the single pressing structure 112 and the shell 111 are integrally formed, and a side view of the shell 111 has a linear shape, and a side view of the single pressing structure 112 has a 7-shape rotated 90 degrees counterclockwise along a third direction. Referring to FIG. 8, FIG. 8 is a schematic diagram of a second structure of the rear shell of the display device provided by one embodiment of the present application. In another embodiment, the rear shell 11 includes one single pressing structure 112 and one shell 111. Similarly, the single pressing structure 112 and the shell 111 are also integrally formed, a side view of the shell 111 has a linear shape, and a side view of the single pressing structure 112 has a 7-shaped which first rotated 90 degrees clockwise in the third direction, and then rotated 180-degree in the second direction. FIG. 8 and FIG. 6 are symmetrical figures with respect to the first direction. In this structure of the rear shell 11, on the one hand, a maximum length of the single pressing structure 112 in the second direction is equal to a distance between the second cover plate 142 and the third cover plate 143, that is, the fourth length L4, which facilitates a positioning of the display device 1 along the second direction, and also facilitates a stable placement of the display module 12 on the side of the single pressing structure close to the first cover plate 141; on the other hand, a length of a portion of the single pressing structure 112 along the second direction is greater than the length of the display module 12 along the second direction, to greatly improve stability of the fixation of the display module 12 along the second direction. Further, a certain gap is also provided between the single pressing structure 112 and the shell 111, which reserves space for the placement of other components. For example, a circuit board 15 may be arranged between the gap between the single pressing structure 112 and the shell 111.

Figure 9:
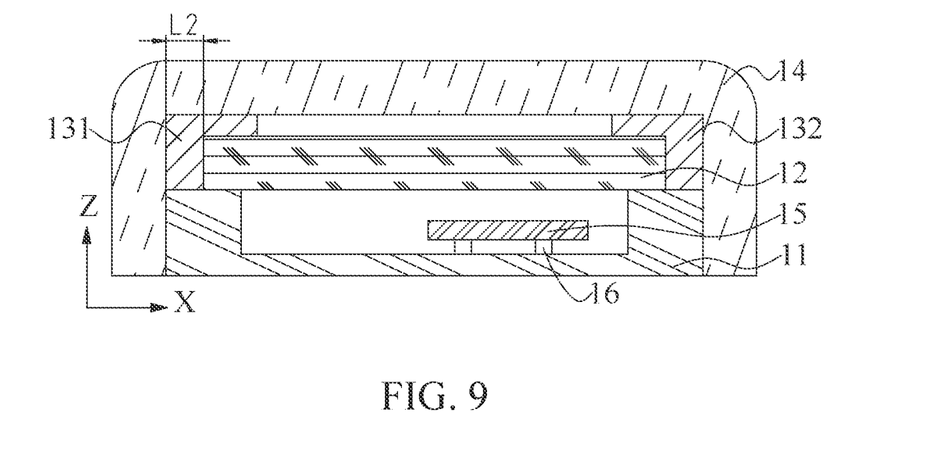
FIG. 9 is a schematic diagram of a fifth structure of the display device provided by one embodiment of the present application.
Figure 11:
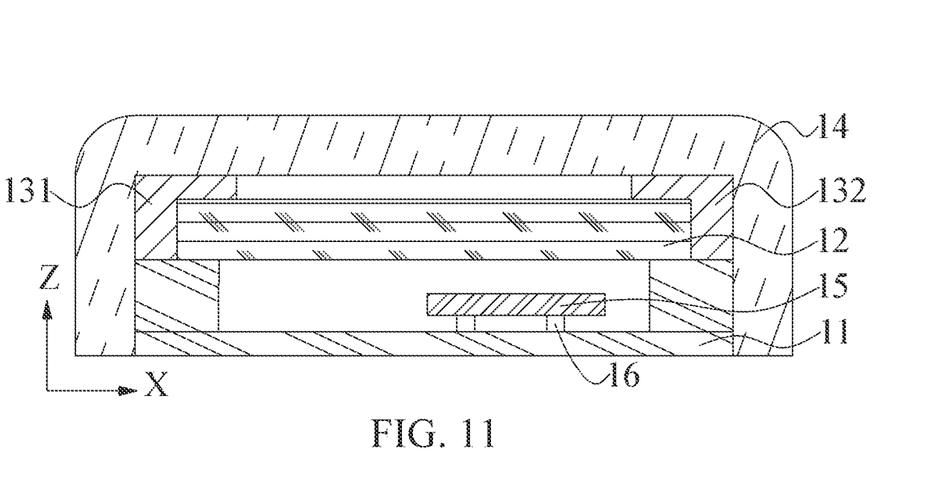
FIG. 11 is a schematic diagram of a sixth structure of the display device provided by one embodiment of the present application.
Figure 13:
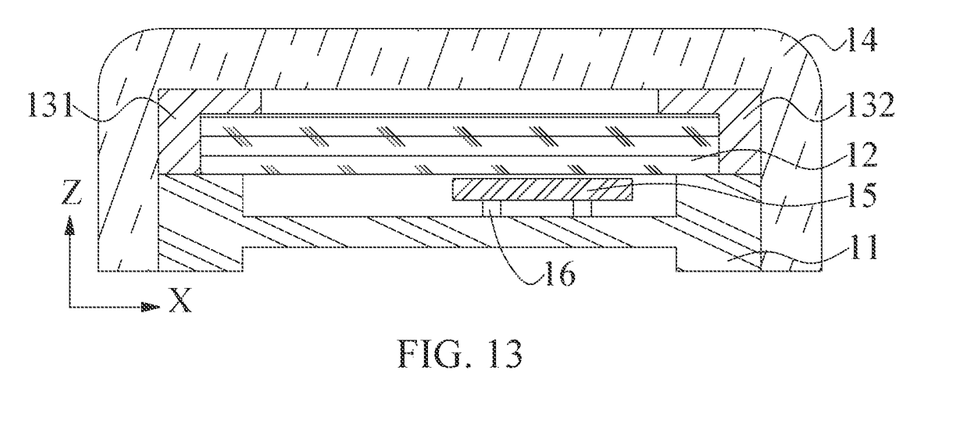
FIG. 13 is a schematic diagram of a seventh structure of the display device provided by one embodiment of the present application.
Figure 15:
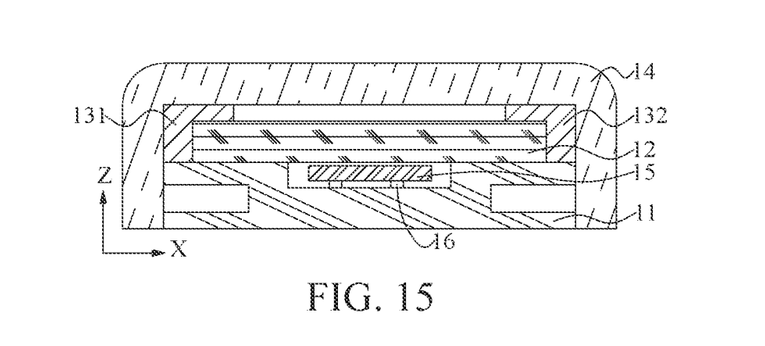
FIG. 15 is a schematic diagram of an eighth structure of the display device provided by one embodiment of the present application.
Figure 17:
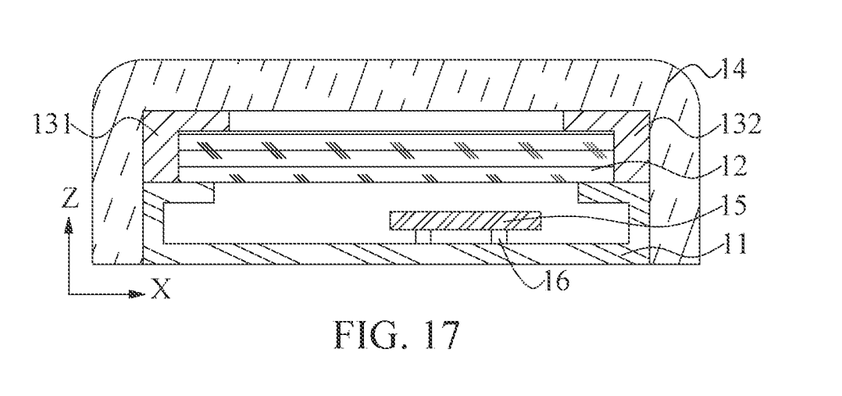
FIG. 17 is a schematic diagram of a ninth structure of the display device provided by one embodiment of the present application.

In some embodiments, the rear shell 11 includes two pressing structures. Referring to FIG. 9, FIG. 9 is a schematic diagram of a fifth structure of the display device provided by one embodiment of the present application. Referring to FIG. 11, FIG. 11 is a schematic diagram of a sixth structure of the display device provided by one embodiment of the present application. Referring to FIG. 13, FIG. 13 is a schematic diagram of a seventh structure of the display device provided by one embodiment of the present application. Referring to FIG. 15, FIG. 15 is a schematic diagram of an eighth structure of the display device provided by one embodiment of the present application. Referring to FIG. 17, FIG. 17 is a schematic diagram of a ninth structure of the display device provided by one embodiment of the present application.

In some embodiments, when the rear shell 11 includes two pressing structures, the two pressing structures include a first pressing structure 112 and a second pressing structure 113, wherein the first pressing structure 112 is arranged at a terminal close to the second cover plate 142 of the rear shell 11, the second pressing structure 113 is arranged at a terminal close to the third cover plate 143 of the rear shell 11, and the first pressing structure 112 and the second pressing structure 113 are oppositely disposed.

Further, a distance between the second cover plate 142 and the display module 12 is a second length L2, as shown in FIG. 9 for details, a length of the first pressing structure 112 extending in the second direction is shorter than a second length L2, similarly, a length of the second pressing structure 113 extending along the second direction is also shorter than the second length L2.

Figure 10:
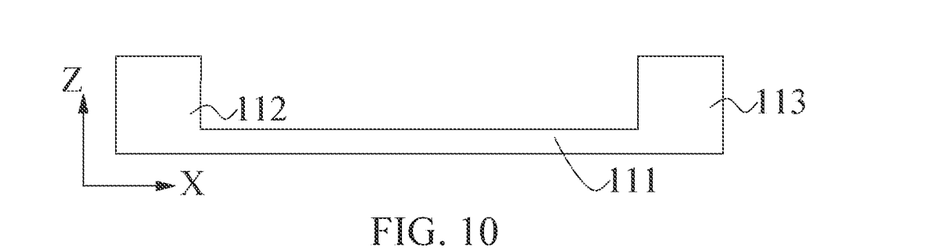
FIG. 10 is a schematic diagram of a third structure of the rear shell of the display device provided by one embodiment of the present application.

Referring to FIG. 10, FIG. 10 is a schematic diagram of a third structure of the rear shell of the display device according to one embodiment of the present application. In one embodiment, the rear shell 11 includes a shell 111, a first pressing structure 112, and a second pressing structure 113, wherein the shell 111, the first pressing structure 112, and the second pressing structure 113 are integrally formed, a side view of the shell 111 has a linear-shape, and the side views of the first pressing structure 112 and the second pressing structure 113 are both linear-shape, and an overall side view of the rear shell 11 has a U shape. Since a length of the first pressing structure 112 extending in the second direction is shorter than the second length L2, a length of the second pressing structure 113 extending in the second direction is shorter than the second length L2, that is, a distance between the first pressing structure 112 and the second pressing structure 113 is shorter than the length of the display module 12 along the second direction. Therefore, a bottom terminal of the display module 12 can be stably placed on the rear shell 11, ensuring a stability of the positioning of the display module 12 and the rear shell 11 along the first direction; further, the U-shaped opening also reserves space for other components.

Figure 12:
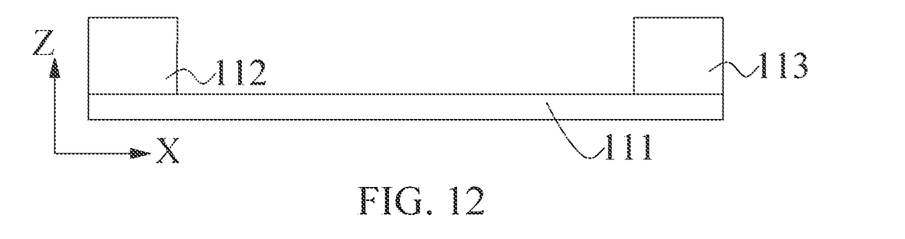
FIG. 12 is a schematic diagram of a fourth structure of the rear shell of the display device provided by one embodiment of the present application.

Referring to FIG. 12, FIG. 12 is a schematic diagram of a fourth structure of the rear shell of the display device provided by one embodiment of the present application. In another embodiment, similarly, the rear shell 11 includes a shell 111, a first pressing structure 112, and a second pressing structure 113. A side view of the shell 111 has a linear shape, a side view of the first pressing structure 112 and the second pressing structure 113 both have a linear shape, and an overall side view of the rear shell 11 has a U-shape. A difference is that the first pressing structure 112 and the second pressing structure 113 are made of elastic materials, and then are adhered to one side of the shell 111 by means of bonding. First, due to a length of the first pressing structure 112 extending in the second direction being shorter than the second length L2, and a length of the second pressing structure 113 extending in the second direction being shorter than the second length L2, that is, the distance between the first pressing structure 112 and the second pressing structure 113 is shorter than a length of the display module 12 along the second direction, a bottom of the display module 12 can be stably placed on the rear shell 11, ensuring the positioning stability of the display module 12 and the rear shell 11 along the first direction. Then, an opening on a side of the rear shell 11 close to the display module 12 also reserves space for other components. Further, due to material of the first pressing structure 112 and the second pressing structure 113 being elastic materials, first, the fixing of the components along the first direction inside the display device 1 is made more stable and flexible; and second, an arrangement of the elastic material reduces a vibration of the components in the display device 1 when receiving an external force.

Figure 14:
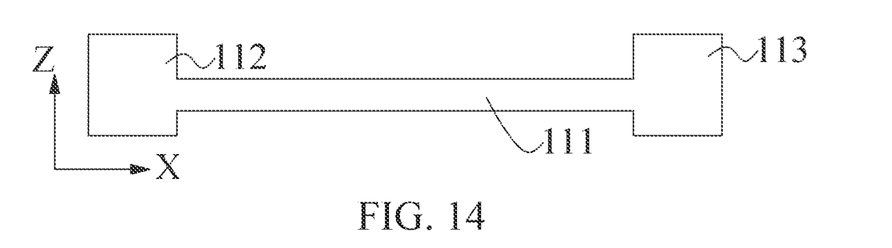
FIG. 14 is a schematic diagram of a fifth structure of the rear shell of the display device provided by one embodiment of the present application.

Referring to FIG. 14, FIG. 14 is a schematic diagram of a fifth structure of the rear shell of the display device provided by one embodiment of the present application. In another embodiment, similarly, the rear shell 11 includes a shell 111, a first pressing structure 112, and a second pressing structure 113. A side view of the shell 111 has a linear shape, and side views of the first pressing structure 112 and the second pressing structure 113 both have a linear shape. A difference is that an overall side view of the rear shell 11 has a I-shape rotated 180 degrees clockwise or counterclockwise along the third direction. Similarly, since a length of the first pressing structure 112 extending in the second direction is shorter than the second length L2, the length of the second pressing structure 113 extending in the second direction is shorter than the second length L2, that is, a distance between the first pressing structure 112 and the first pressing structure 113 is shorter than the length of the display module 12 along the second direction. Therefore, a bottom of the display module 12 can be stably disposed on the rear shell 11 to ensure the stability of the positioning of the display module 12 and the rear shell 11 along the first direction. Further, an opening on the side of the rear shell 11 close to the display module 12 also reserves space for disposing other components.

Figure 16:
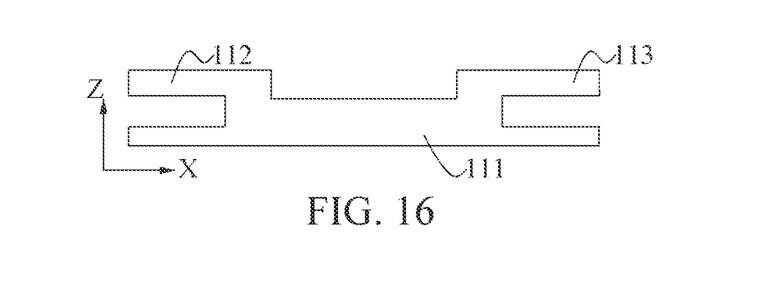
FIG. 16 is a schematic diagram of a sixth structure of the rear shell of the display device provided by one embodiment of the present application.

Referring to FIG. 16, FIG. 16 is a schematic diagram of a sixth structure of the rear shell of the display device provided by one embodiment of the present application. In another embodiment, similarly, the rear shell 11 includes a shell 111, a first pressing structure 112, and a second pressing structure 113. A side view of the shell 111 has linear shape, a side view of the second pressing structure 113 has a 7-shape rotated 90 degrees in counterclockwise along the third direction, a side view of the first pressing structure 112 is obtained by mirroring the second pressing structure 113 with respect to the first direction, and an overall side view of the rear shell 11 has is an I-shaped opening in the middle. Similarly, since a length of the first pressing structure 112 extending along the second direction is shorter than the second length L2, the length of the second pressing structure 113 extending along the second direction is shorter than the length L2. That is, a distance between the first pressing structure 112 and the second pressing structure 113 is shorter than the length of the display module 12 along the second direction. Therefore, a bottom of the display module 12 can be stably placed on the rear shell 11 to ensure the stability of the positioning of the display module 12 and the rear shell 11 along the first direction; further, an opening on a side of the rear shell 11 close to the display module 12 also reserves space for disposing other components.

Figure 18:
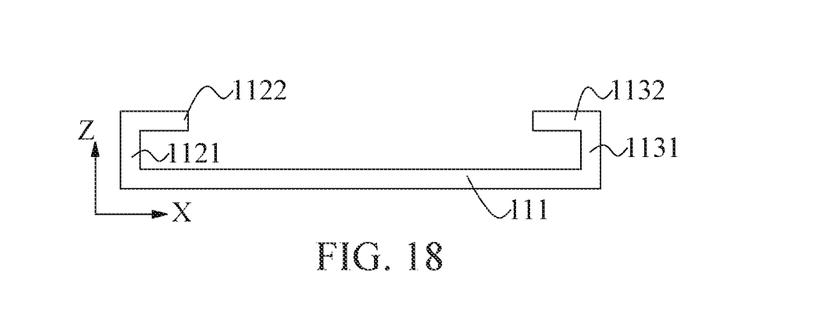
FIG. 18 is a schematic diagram of a seventh structure of the rear shell of the display device provided by one embodiment of the present application.

Referring to FIG. 18, FIG. 18 is a schematic diagram of a seventh structure of the rear shell of the display device provided by one embodiment of the present application. In another embodiment, similarly, the rear shell 11 includes a shell 111, a first pressing structure 112, and a second pressing structure 113. A side view of the shell 111 has a linear shape. A side view of the second pressing structure 113 has a 7-shape, and a side view of the first pressing structure 112 has a 7-shape that is rotated 180 degrees along the third direction. A side view of the whole rear shell 11 has a concave shape. The first pressing structure 112 includes a first portion 1121 of the first pressing structure extending along the first direction and a second portion 1122 of the first pressing structure extending along the second direction. Similarly, the second pressing structure 113 includes a first portion 1131 of the second pressing structure extending along the first direction and a second portion 1132 of the second pressing structure extending along the second direction. Similarly, since a length of the first pressing structure 112 extending along the second direction is shorter than a second length L2, that is, a length of the second portion 1122 of the first pressing structure extending along the second direction is shorter than the second length L2, a length of the second pressing structure 113 extending along the second direction is shorter than the second length L2; a length of the second portion 1132 of the second pressing structure extending along the second direction is shorter than the second length L2; that is, a distance between the second portion 1122 of the first pressing structure and the second portion 1132 of the second pressing structure is shorter than a length of the display module 12 along the second direction. Therefore, a bottom of the display module 12 can be stably placed on the rear shell 11, ensuring the stability of the positioning of the display module 12 and the rear shell 11 along the first direction. Further, the first portion 1121 of the first pressing structure is attached to one side of the second cover plate 142, and the first portion 1131 of the second pressing structure is attached to one side of the third cover plate 143, so that a space in the concave-shaped opening is made larger, reserving space for disposing other components and further saving materials used for the rear shell at the same time.

Further, a material of the pressing structure can be made of elastic material. The structural design of this elastic material can well transmit and absorb an impact of external force, which has great significance to the structure after the middle frame is removed.

Further, the rear shell 11 further includes a housing, the pressing structure includes a pressing portion and a connecting portion, the pressing portion abuts against a side of the display module 12 away from the first cover plate 141, and the connecting portion is connected to the shell 111. The connecting portion and the shell 111 may be integrally formed or non-integrally formed, that is, the connecting portion and the shell 111 may be adhered together by an adhesive material. In other words, the material of the pressing structure and the shell 111 may be the same or different. For example, the pressing structure and the shell 111 are made of elastic materials, or both are made of inelastic materials, or the pressing structure is made of elastic material, and the shell 111 is made of inelastic material. When the elastic material is used for the pressing structure, the structural design of this elastic material can well transmit and absorb the impact of external force, which can slow down a vibration of the internal components of the display device 1, and make the positioning of the device 1 along the first direction more stable.

Further, the rear shell 11 further includes a second accommodating space formed by the pressing structure and the shell 111. The second accommodating space is used to place various components, such as circuit boards, etc., to prevent external impurities, moisture, etc., from affecting the quality of the internal components of the display device 1.

Figure 19:
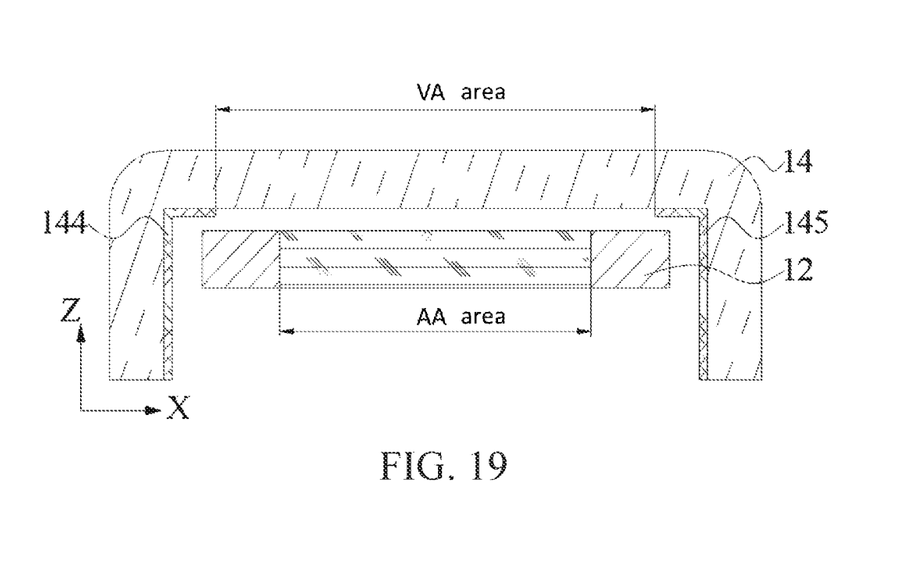
FIG. 19 is a schematic diagram of a tenth structure of the display device provided by one embodiment of the present application.

Further, referring to FIG. 19, FIG. 19 is a schematic diagram of a tenth structure of the display device provided by one embodiment of the present application. An inner surface of the cover plate 14 is also provided with a black silk screen, which covers all areas on the inner surface of the cover plate 14 except for the view area (VA), that is, the inner surface between the second cover plate 142 and the first cover plate 141 and the first cover plate 141 is provided with a first black silk screen 144, and the inner surface between the first cover plate 141 and the third cover plate 143 is provided with a second black silk screen 145. A purpose of disposing the black silk screen is to ensure aesthetics of the appearance of the display device 1. Since material of the cover plate 14 is transparent, the black silk screen prevents the user from seeing the internal components which affect the aesthetics. Further, it can be seen from FIG. 19 that a length of the view area along the second direction (X direction) is greater than a length of the active area (AA) along the second direction (X direction), that is, the viewing angle range of the view area is larger than the viewing angle range of the active area.

Further, the circuit board 15 is arranged in the opening of the rear shell 11, the circuit board 15 is used for driving the display device 1, and the rear shell 11 and the circuit board 15 can be fixedly connected by rivets or screws 16, to ensure a stability of the circuit board 15. When manufacturing the rear shell 11, it is necessary to first check the screw hole positions on the circuit board 15, and calculate and mark the corresponding screw hole positions on the rear shell 11 along the coordinates of the first direction, the second direction (X direction), and the third direction respectively, and then directly punching the holes during manufacturing, which facilitates the subsequent positioning and installation between the rear shell 11 and the circuit board 15.

Therefore, the beneficial effects of the display device provided by the embodiment of the present application are as follows: First, in the display device provided by the embodiment of the present application, the display device 1 comprises: a rear shell 11, a display module 12, and a cover plate 14, which are sequentially stacked and arranged along the first direction; a side view of the cover plate 14 has an n-shape, and a portion of the n-shape along the first direction is the second cover plate 142 and the third cover plate 143. The portion of the n-shape along the second direction is the first cover plate 141; the rear shell 11, the display module 12, and the first cover plate 141 cooperate with each other and fix the display device 1 in the first direction; the second cover plate 142, the rear shell 11, and the third cover plate 143 cooperate with each other to fix the display device 1 in the second direction 1. This structural design removes the middle frame and reduces the cost of the display device 1. Further, because the middle frame is removed, the manufacturing between the cover plate 14 and the display module 12 can be completed by only pasting once, which simplifies the manufacturing steps, reduces the gap between the cover plate 14 and the display module 12, and maximizes the touch sensitivity of the touch layer in the display module 12. Finally, since the cover plate 14 is arranged to have an n-shape, a portion of the n-shape along the first direction, which is the second cover plate 142 and the third cover plate 143, limits the second direction of the display device 1, ensuring a stability of the display device 1 along the second direction; while a portion of the n-shape along the second direction, which is the first cover plate 141, limits the first direction of the display device 1, ensuring the stability of the display device 1 along the first direction.

The above describes in detail a display device provided by one embodiment of the present application. Specific examples are used in this article to describe the principles and implementations of the present application. The description of the above embodiments is only used to help understand the technical solutions and core ideas of the present application. Those of ordinary skill in the art should understand that they can still modify the technical solutions recorded in the foregoing embodiments, or equivalently replace some of the technical features. However, these modifications or replacements do not cause the essence of the corresponding technical solutions to deviate from the scope of the technical solutions of the embodiments of the present application.

What is claimed is:

1. A display device, comprising:
   a cover plate comprising a first cover plate, and a second cover plate and a third cover plate respectively adjacent to both terminals of the first cover plate, wherein the first cover plate, the second cover plate, and the third cover plate form a first accommodating space;
   a display module positioned in the first accommodating space and at least partially attached to the first cover plate; and
   a rear shell opposite to the first cover plate and connected to the second cover plate and the third cover plate;
   wherein the display module is attached to the first cover plate by a black conductive adhesive comprising a first black conductive adhesive and a second black conductive adhesive, a first portion of the first black conductive adhesive and a first portion of the second black conductive adhesive cover a region other than a view area between the first cover plate and the display module;
   a second portion of the first black conductive adhesive is disposed between the second cover plate and the display module, and a second portion of the second black conductive adhesive is disposed between the third cover plate and the display module,
   wherein the second portion of the first black conductive adhesive intersects the first portion of the first black conductive adhesive and comprises a free end flush with a bottom surface of the display module; the second portion of the second black conductive adhesive intersects the first portion of the second black conductive adhesive and comprises another free end flush with the bottom surface of the display module; the display module is attached to the first cover plate and the second cover plate by the first black conductive adhesive, and the display module is attached to the first cover plate and the third cover plate by the second black conductive adhesive.

2. The display device according to claim 1, wherein the display device is a rectangular parallelepiped, and wherein the display device extends in a first direction, a second direction, and a third direction, respectively.

3. The display device according to claim 2, wherein the first direction is perpendicular to the second direction, and the third direction is perpendicular to the first direction and is also perpendicular to the second direction.

4. The display device according to claim 1, wherein the display module comprises a touch layer disposed facing the first cover plate.

5. The display device according to claim 4, wherein a distance between the first cover plate and the touch layer is a first length, and wherein a length of the first length is shorter than or equal to 0.05 mm.

6. The display device according to claim 1, wherein the second cover plate is parallel to the third cover plate, and wherein the second cover plate and the third cover plate are perpendicular to the first cover plate, respectively.

7. The display device according to claim 6, wherein an outer corner between the second cover plate and the first cover plate, and an outer corner between the first cover plate and the third cover plate are rounded corners.

8. The display device according to claim 7, wherein a thickness of the second cover plate is equal to a thickness of the first cover plate and is equal to a thickness of the third cover plate, and wherein a length of the second cover plate is equal to a length of the third cover plate and is shorter than a length of the first cover plate.

9. The display device according to claim 7, wherein a side of the second cover plate or the third cover plate away from the rear shell is further provided with a headphone jack, a universal serial bus jack, a power jack, a headphone jack, or a screw hole.

10. The display device according to claim 1, wherein the rear shell comprises at least one pressing structure, and a side of the pressing structure abuts a side of the display module away from the first cover plate.

11. The display device according to claim 10, wherein the rear shell further comprises a housing, the pressing structure comprises a pressing portion and a connecting portion, the pressing portion abuts against the side of the display module away from the first cover plate, and the connecting portion is connected to the housing.

12. The display device according to claim 11, wherein the pressing structure is made of an elastic material.

13. The display device according to claim 12, wherein the rear shell further comprises a second accommodating space formed by the pressing structure and the housing, and the second accommodating space is configured to accommodate electronic devices.

14. The display device according to claim 10, wherein the at least one pressing structure is single pressing structure or two pressing structures.

15. The display device according to claim 10, wherein the pressing structure is made of an elastic material.

16. The display device according to claim 1, wherein a material of the cover plate is selected from polymethyl methacrylate, polycarbonate, or polyethylene terephthalate.

17. The display device according to claim 1, wherein an inner surface of the cover plate is further provided with a black silk screen.

* * * * *